United States Patent
Hofmann et al.

(10) Patent No.: US 10,138,941 B2
(45) Date of Patent: Nov. 27, 2018

(54) BEARING RING

(71) Applicant: Aktiebolaget SKF, Gothenburg (SE)

(72) Inventors: Sabine Hofmann, Wuerzburg (DE); Baozhu Liang, Dittelbrunn-Hambach (DE); Johannes Ullmann, Wonfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/523,152

(22) PCT Filed: Oct. 27, 2015

(86) PCT No.: PCT/EP2015/074828
§ 371 (c)(1),
(2) Date: Apr. 28, 2017

(87) PCT Pub. No.: WO2016/066623
PCT Pub. Date: May 6, 2016

(65) Prior Publication Data
US 2017/0328412 A1    Nov. 16, 2017

(30) Foreign Application Priority Data

Oct. 31, 2014   (DE) .................. 10 2014 222 278

(51) Int. Cl.
| | |
|---|---|
| *F16C 43/04* | (2006.01) |
| *F16C 33/78* | (2006.01) |
| *F16C 33/58* | (2006.01) |
| *F16C 33/60* | (2006.01) |
| *F16C 35/073* | (2006.01) |
| *F16C 19/26* | (2006.01) |
| *F16C 19/36* | (2006.01) |

(52) U.S. Cl.
CPC ........ *F16C 33/7873* (2013.01); *F16C 33/585* (2013.01); *F16C 33/605* (2013.01); *F16C 35/073* (2013.01); *F16C 19/26* (2013.01); *F16C 19/364* (2013.01); *F16C 2300/14* (2013.01); *F16C 2360/31* (2013.01)

(58) Field of Classification Search
CPC .... F16C 35/062; F16C 2237/00; F16C 35/06; F16C 35/063; F16C 35/067; F16C 35/07; F16C 35/073; F16C 35/077
See application file for complete search history.

(56) References Cited

U.S. PATENT DOCUMENTS 1,764,116 A * 6/1930 Noble ............... B25B 27/062
  29/261
2005/0132554 A1* 6/2005 Bridges ............ B25B 27/062
  29/426.1

FOREIGN PATENT DOCUMENTS

| | | |
|---|---|---|
| BE | 1017335 A3 | 6/2008 |
| DE | 102010062329 A1 * | 6/2012 ........... B25B 27/062 |

(Continued)

*Primary Examiner* — Phillip A Johnson
(74) *Attorney, Agent, or Firm* — Bryan Peckjian; SKF USA Inc. Patent Dept.

(57) ABSTRACT

A bearing ring for a rolling-element bearing including an axially extending outer surface, two radially extending side surfaces, an inner surface configured to at least partially contact a rolling element and at least one radially extending recess in the inner surface that is configured to work together with a lifting tool to allow the bearing ring to be lifted by the lifting tool. Also a method of lifting a bearing ring having such a recess.

17 Claims, 3 Drawing Sheets

(56) References Cited

FOREIGN PATENT DOCUMENTS

| | | | | | |
|---|---|---|---|---|---|
| EP | 1574730 | A1 | * | 9/2005 | ............ F16C 19/166 |
| JP | 2014001800 | A | * | 1/2014 | .............. F16C 35/06 |
| JP | 20141800 | A | | 7/2015 | |

* cited by examiner

BEARING RING

CROSS-REFERENCE

This application is the U.S. National Stage of International Application No. PCT/EP2015/074828 filed on Oct. 27, 2015, which claims priority to German patent application no. 10 2014 222 278.8 filed on Oct. 31, 2014.

TECHNOLOGICAL FIELD

The present invention relates to a bearing ring for a rolling-element bearing, as well as to a rolling-element bearing including such a bearing ring.

BACKGROUND

In order to bring rolling-element bearings or rolling-element bearing rings to their installation position, it is often necessary to lift and to move the entire rolling-element bearing or the rolling-element bearing rings individually. In particular with large rolling-element bearings, such as, for example, for wind turbines, it is imperative to be able to mechanically lift the rolling-element bearings.

With rolling-element bearings in the assembled state that additionally include a two-part outer ring, such a lifting and moving is possible without problems since a lifting tool can easily engage in the gap formed by the two-part bearing outer ring, and thus the bearing can be lifted as a whole part. However, if only a single ring is lifted, or the outer ring is manufactured one-part, then an engaging on the side surface is not possible.

SUMMARY

Therefore in the prior art threaded bores have been applied to the side surfaces of the bearing ring, into which, for example, a screw can be screwed-in in order to attach the lifting tool thereto and to lift the bearing ring or the rolling-element bearing itself. However, a disadvantage of this prior art is that cracks can arise on the bearing ring in the region of the threaded bore due to tensile stresses. Such tensile stresses arise in particular due to press-fit between inner ring and shaft or outer ring and housing. The bearing ring is thereby damaged and the bearing operation must be suspended. In addition, in some bearings due to the bearing ring geometry the introducing of a threaded bore is not possible, since an available bearing ring thickness is configured too small.

The object of the present invention is therefore to provide a possibility that permits a mechanical lifting and moving of a rolling-element bearing or of a single bearing ring without limiting the structural stability of the ring or of the bearing.

This object is achieved by a bearing ring according to patent claim 1 as well as a rolling-element bearing according to patent claim 9.

According to the invention a bearing ring is provided for a rolling-element bearing including a preferably axially extending outer surface, two preferably radially extending side surfaces, and an inner surface that is designed to at least partially contact a rolling element. In order to be able to lift such a bearing ring without structural impairment by threaded bores, according to the invention at least one recess is formed in the inner surface, which recess is designed to work together with a lifting tool. Since the recess is no longer formed as a threaded bore in the side surface, a tensile stress arising due to a press-fit between inner ring and shaft or outer ring and housing no longer leads to a crack formation in the region of the threaded bore.

According to a preferred exemplary embodiment the inner surface includes a rolling-element contact surface and a first and/or second edge surface axially lateral to the rolling-element contact surface. Here it is advantageous in particular if the recess is formed in the first and/or second edge surface. The movement of the rolling elements on the inner surface is thereby not impaired by the recess.

It is advantageous in particular here if one of the bearing rings extends axially over the other bearing ring, i.e., one of the bearing rings is configured axially longer than the other bearing ring. The accessibility of the lifting tool to the recess can thereby be improved.

According to a further advantageous exemplary embodiment a depth of the recess extends essentially radially. A tool can thereby be introduced into the recess from radially outward or from radially inward, so that the bearing ring can be easily lifted in the axial direction. The depth T here can be adapted to the weight of the bearing ring and/or the lifting tool. A depth of at least 1 mm is usually provided.

In order that a certain clearance can be provided for the introducing of the lifting tool, a length of the recess preferably extends essentially along the circumference of the bearing ring.

According to a further advantageous exemplary embodiment at least one recess is designed as a circumferentially configured groove. Such a groove is on the one hand easy to form, and on the other hand the lifting tool can engage at any point on the bearing ring, with the result that a time-consuming positioning of the lifting tool relative to the recesses can be omitted.

According to a further advantageous exemplary embodiment at least one of the recesses is configured as at least two discrete notches. Such a design is advantageous if as little as possible material loss is to be provided to the bearing due to the recess. In order to apply a uniform-as-possible load to the bearing ring during lifting, the notches are preferably uniformly distributed over the circumference.

According to a further advantageous exemplary embodiment the recess is milled or turned. An easily and quickly manufacturable recess can thereby be formed.

According to a further advantageous exemplary embodiment the first and/or second edge surface is configured as a first and/or second ring shoulder, in particular as a first and/or second flange. In particular in cylindrical roller bearings and tapered roller bearings, flanges are provided that make possible a guiding of the rolling elements. Since these flanges or ring shoulders often have an increased thickness, a forming of the inventive recess at this point is particularly advantageous.

A further aspect of the present invention relates to a rolling-element bearing including one of the above-described bearing rings.

Further advantages and advantageous embodiments are specified in the claims, the description, and the drawings.

In the following the invention shall be described in more detail with reference to the exemplary embodiments depicted in the drawings. Here the exemplary embodiments are of a purely exemplary nature and are not intended to establish the scope of the invention. This scope is defined solely by the pending claims.

BRIEF DESCRIPTION OF THE DRAWINGS

In the following, identical or functionally equivalent elements are designated by the same reference numbers.

DETAILED DESCRIPTION

Figure 1:
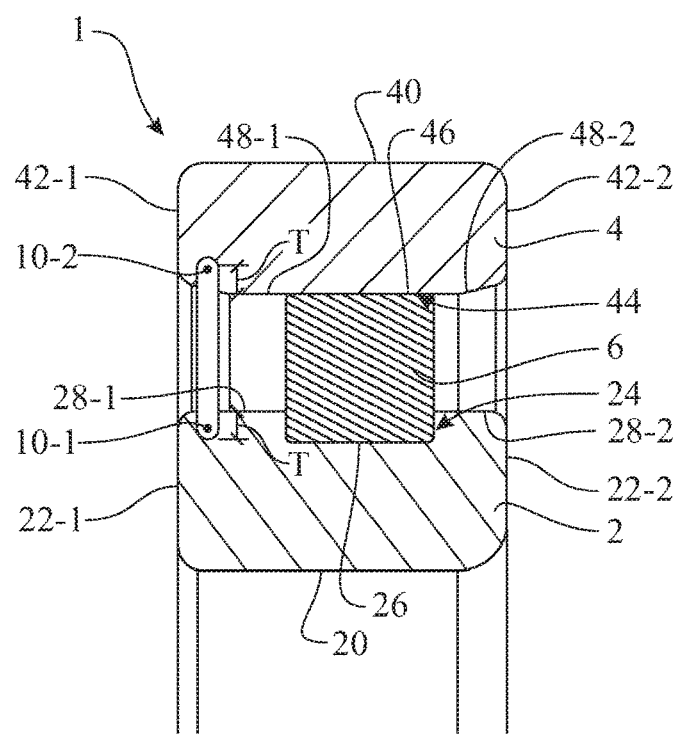
FIG. 1 shows a schematic sectional view through a first preferred exemplary embodiment of an inventive rolling-element bearing.
Figure 2:
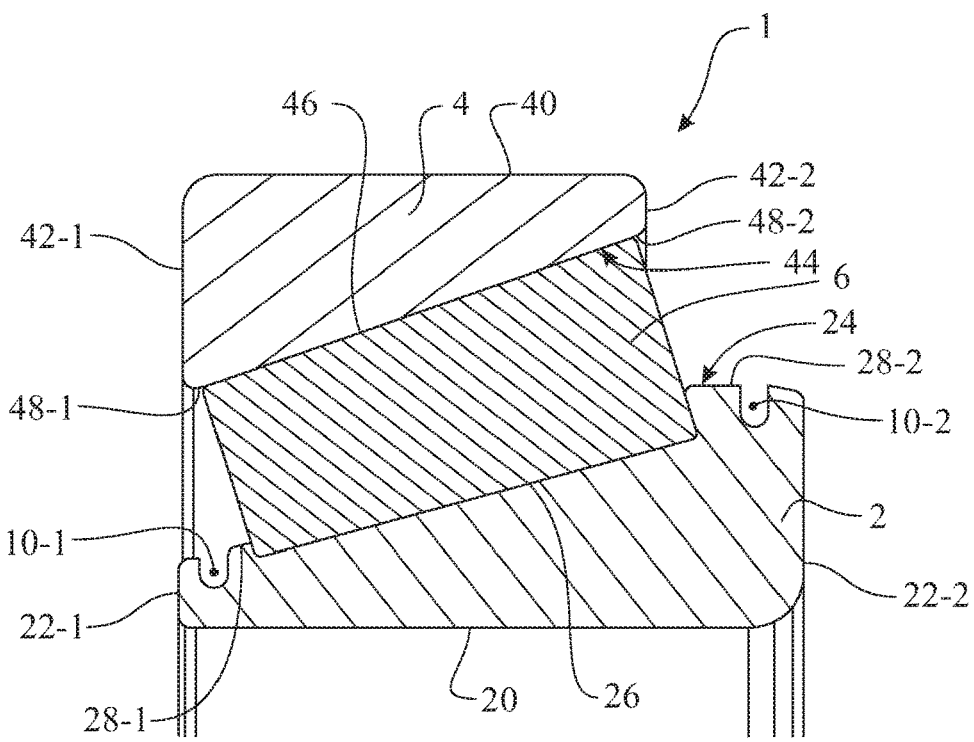
FIG. 2 shows a schematic sectional view through a second preferred exemplary embodiment of an inventive rolling-element bearing.

FIGS. 1 and 2 each schematically show a sectional view though a rolling-element bearing 1 including a bearing inner ring 2 and a bearing outer ring 4, between which rolling elements 6 are disposed. Here the rolling-element bearing 1 depicted in FIG. 1 is configured as a cylindrical roller bearing, while a tapered roller bearing is shown in FIG. 2. However, it is explicitly noted that rolling-element bearings other than those shown can also be equipped according to the invention.

As can furthermore be seen from FIG. 1 and FIG. 2, the bearing inner ring 2 and the bearing inner ring 4 each include a bearing-ring outer surface 20; 40 that extends essentially axially. Furthermore the bearing inner ring 2 and the bearing outer ring 4 each have two essentially radially extending side surfaces 22-1; 22-2; 42-1; 42-2 and each an inner surface 24, 44.

The inner surfaces 24, 44 of the bearing rings 2, 4 in turn include a rolling-element contact surface 26, 46 as well as a first and second edge surface 28-1, 28-2; 48-1, 48-2 disposed axially laterally thereto. Furthermore, FIGS. 1 and 2 show that a recess 10 is formed in the inner surfaces 24, 44 or on at least one of the edge surfaces 28-1; 28-2; 48-1; 48-2, which recess 10 is designed such that a lifting tool can engage into it.

The recess 10 itself can be configured as a circumferentially configured groove; however it is also possible to provide notches discretely distributed over the circumference, into which notches a lifting tool can engage. The notch or groove would be formed including a pair of generally radially extending, generally parallel, and opposing facing groove surfaces. A depth T of the recess extends essentially radially, while a length of the recess, in particular of a notch, is configured circumferential. The depth T here can be adapted to the weight of the bearing ring and/or the lifting tool. A depth of at least 1 mm is usually provided.

As can furthermore be seen from FIG. 1 and FIG. 2, lateral edge regions 28-1, 28-2 can be formed as bearing-ring shoulders on the bearing ring 2, which lateral edge regions 28-1, 28-2 have a greater radial thickness than the rolling-element contact surface 26. Thus on the one hand an integral flange can be formed on the inner ring, which flange serves for guiding or retaining the rolling-element bearing 6, on the other hand the greater thickness increases the structural stability despite the formed recess 10.

In particular it can be seen from FIG. 2 that in tapered roller bearings the bearing rings 2, 4 have different diameters at the inner surface 24. Thus, for example, the diameter of the first edge surface 28-1 is significantly smaller than the diameter of the second edge surface 28-2. At the same time, however, it can also be seen from FIG. 2 that, since the first edge region 28-1 of the bearing inner ring 2 is simultaneously configured as a flange for the rolling element 6, sufficient material is available to on the one hand form the recess 10-1 and on the other hand simultaneously ensure a sufficient structural stability despite the recess 10.

As can be seen in particular from the cylindrical roller bearing depicted in FIG. 1, both a recess 10-1 on the inner ring 2 in the first edge region 28-1 and a recess 10-2 in the outer ring 4 are formed. The recesses 10-1, 10-2 in turn serve for a lifting tool to be able to engage on the bearing rings 2, 4, and the bearing rings 2, 4 separately or the bearing 1 as an entire unit are movable.

In contrast, in the tapered roller bearing 1 depicted in FIG. 2 the bearing 1 is also liftable as an entire unit by a tool. In addition, FIG. 2 shows that no recesses are provided in the edge surfaces 48-1, 48-2 of the outer ring 4. Furthermore, however, FIG. 2 shows that not only a recess 10-1 is formed on the inner ring 2 at the smaller diameter, but a recess 10-2 is also provided on the second edge region 28-2, into which a lifting tool can also engage. If the lifting tool engages, for example, into the groove 10-1, then the assembled bearing can be lifted. In addition this configuration has the advantage that no matter which side surface 22-1, 22-2 the bearing lies on an engaging of a lifting tool is possible at any time.

Of course it is also possible to also form a cylindrical roller bearing, as depicted in FIG. 1, including recesses 10 on first and second edge surfaces 28-1; 28-2. A person skilled in the art also directly infers that recesses 10 can also be provided in the outer ring 4 of the tapered roller bearing 1 depicted in FIG. 2, or, as FIG. 3 shows, no recesses provided in the outer ring 4 of the cylindrical roller bearing 1.

Figure 3:
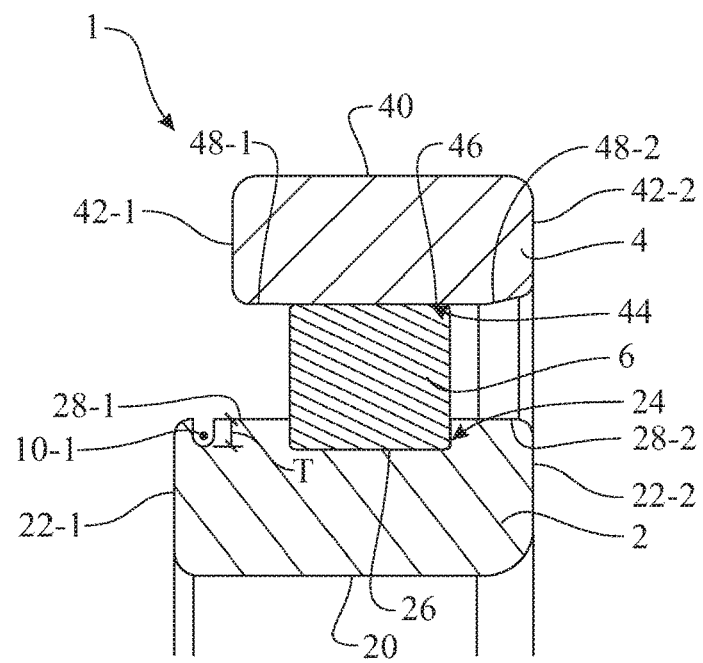
FIG. 3 shows a schematic sectional view through a third preferred exemplary embodiment of an inventive rolling-element bearing.
Figure 4:
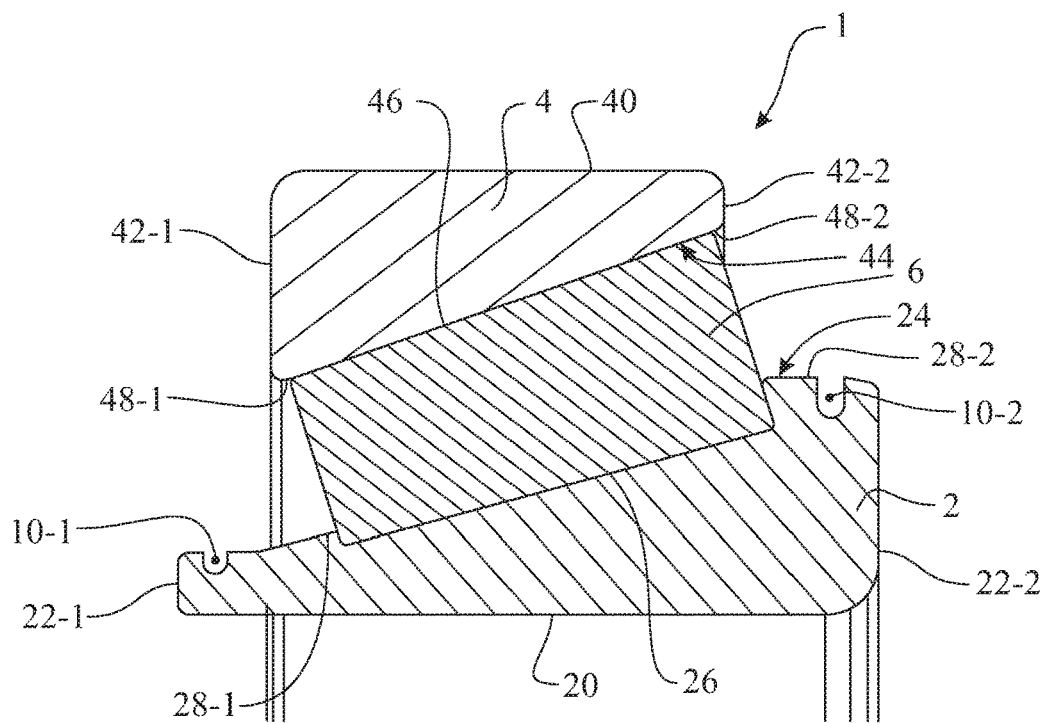
FIG. 4 shows a schematic sectional view though a fourth preferred exemplary embodiment of an inventive rolling-element bearing.

FIGS. 3 and 4 each show a further exemplary embodiment for a cylindrical roller bearing (FIG. 3) and a tapered roller bearing (FIG. 4). In contrast to FIG. 1 and FIG. 2, the exemplary embodiments in FIGS. 3 and 4 show that the inner ring 2 can respectively be configured axially lengthened in order to provide an improved access for the lifting tool. The axial lengthening can be provided not only one-sided (FIG. 2 and FIG. 3) but also two-sided (FIG. 4). In the exemplary embodiment shown in FIG. 4 the axial lengthening on the side of the small diameter also makes it possible that the bearing can be lifted in its entirety via the groove 10-1.

Figure 5:
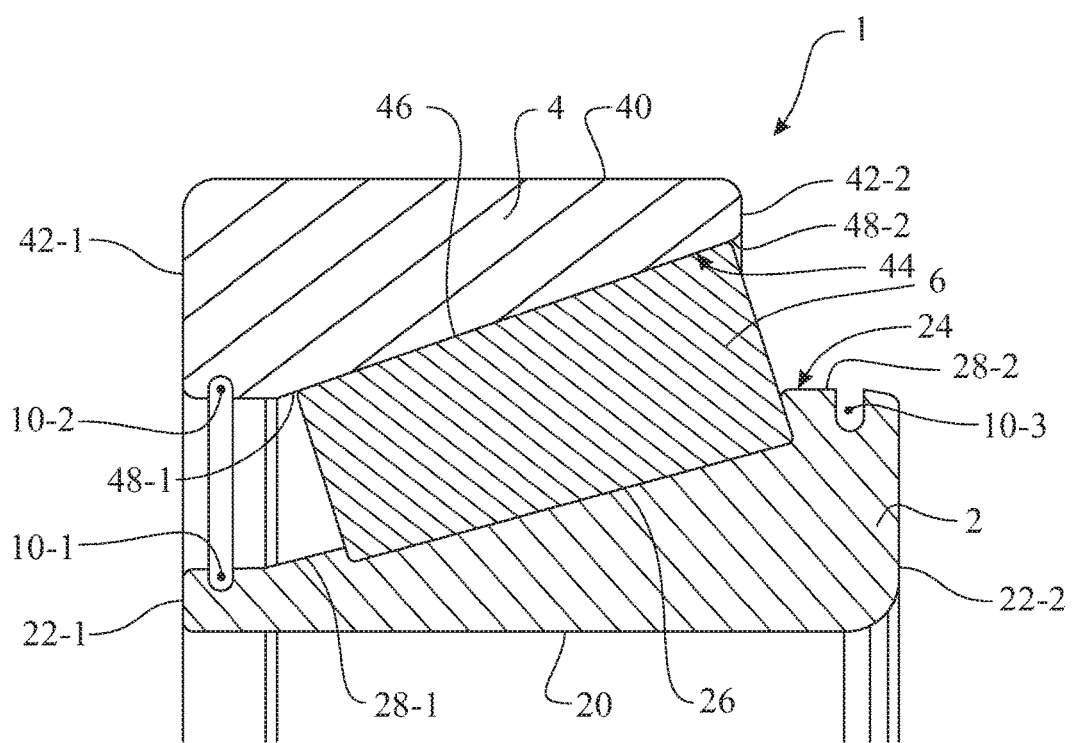
FIG. 5 shows a schematic sectional view though a fifth preferred exemplary embodiment of an inventive rolling-element bearing.

FIG. 5 shows a further exemplary embodiment for a tapered roller bearing. Similar to FIGS. 2 and 4, a first one 2 of the two bearing rings 2, 4, is axially longer than a second one 4 of the two bearing rings 2, 4. In contrast to FIG. 2 and FIG. 4, the exemplary embodiments in FIG. 5 shows that the inner ring 2 can respectively be configured axially lengthened in order to provide an improved access for the lifting tool on one side, similar to the embodiment shown in FIG. 2 and can include both a recess 10-1 on the inner ring 2 in the first edge region 28-1 and a recess 10-2 in the outer ring 4, similar to the embodiment shown in FIG. 1. The recesses 10-1, 10-2 in turn serve for a lifting tool to be able to engage on the bearing rings 2, 4, and the bearing rings 2, 4 separately or the bearing 1 as an entire unit is movable.

The bearing 1 is also liftable as an entire unit by a tool. In addition, Furthermore, FIG. 5 shows a recess 10-1 formed on the inner ring 2 at the smaller diameter, and a recess 10-3 also provided on the second edge region 28-2, into which a lifting tool can also engage. If the lifting tool engages, for example, into the groove 10-1, then the assembled bearing can be lifted. In addition this configuration has the advantage that no matter which side surface 22-1, 22-2 the bearing lies on an engaging of a lifting tool is possible at any time.

Even though the described invention is depicted in the Figures as a cylindrical roller bearing or a tapered roller bearing, it is clear to a person skilled in the art that other rolling-element bearings can also be equipped with correspondingly configured bearing rings 2, 4. Overall using the inventive recesses a lifting tool can be used on a bearing ring or rolling-element bearing, using which lifting tool the bearing ring or the bearing itself can be securely lifted. Since the recess for lifting is no longer disposed in the side surfaces of the bearing rings, but rather on the inner surface, the influence of tensile stresses present in the ring due to press fits is lower than with bores in the side surfaces as is usual in the prior art. A greater structural stability can thereby be achieved for the bearing rings, which in turn leads to a secure bearing operation. Damage due to crack formation in the bearing ring is thus significantly avoided.

REFERENCE NUMBER LIST

1 Rolling-element bearing
3 Bearing inner ring
4 Bearing outer ring
6 Rolling element
10 Recess
20, 40 Bearing-ring outer surface
22, 42 Bearing-ring side surface
24, 44 Inner surface
26, 46 Rolling-element contact surface
28, 48 Edge surface
T Depth of the recess

The invention claimed is:

1. A bearing ring for a rolling-element bearing including an axially extending outer surface;
   two radially extending side surfaces;
   an inner surface comprising a rolling-element contact surface configured to at least partially contact a rolling element; and
   at least two recesses, each recess formed extending inward from in the inner surface at a location proximate and inward from the respective radially extending side surface of the two radially extending side surfaces and configured to work together with a lifting tool, each recess of the at least two recesses comprising a pair of generally radially extending, generally parallel, and opposing facing surfaces,
   wherein at least one of the at least two recesses is formed between a first radially extending side surface of the two radially extending side surfaces and the rolling-element contact surface,
   wherein at least a second of the at least two recesses is formed between a second radially extending side surface of the two radially extending side surfaces and the rolling-element contact surface.

2. The bearing ring according to claim 1, wherein the inner surface includes a rolling-element contact surface and at least one of:
   a first edge surface axially laterally adjacent to the rolling-element contact surface, and
   a second edge surface,
   wherein the at least one recess is formed in at least one of the first edge surface and the second edge surface.

3. The bearing ring according to claim 1, wherein the at least one recess is one of milled or turned.

4. The bearing ring according to claim 2,
   wherein the at least one recess is milled or turned and has a radial depth and circumferential length, and
   wherein the at least one recess is located axially outward of a raceway portion of the bearing inner surface.

5. The bearing ring according to claim 1, wherein a depth of the at least one recess extends substantially radially, and is adapted to a weight of the bearing ring and/or adapted to the lifting tool.

6. The bearing ring according to claim 1, wherein a length of the at least one recess extends substantially circumferentially.

7. The bearing ring according to claim 1, wherein the at least one recess comprises a circumferential groove.

8. The bearing ring according to claim 1, wherein at least one of the at least two recesses comprises at least two discrete notches uniformly distributed over a circumference of the bearing ring.

9. The bearing ring according to claim 2, wherein the at least one of the first edge surface and the second edge surface comprises at least one of a first bearing-ring shoulder and a second bearing-ring shoulder, or as at least one of a first flange and a second flange.

10. A rolling-element bearing including two bearing rings, wherein at least one of the two bearing rings is bearing ring according to claim 1.

11. A method of lifting the bearing ring according to claim 1 comprising placing a portion of the lifting tool in the at least one recess and lifting the bearing ring using the lifting tool.

12. A rolling-element bearing including two bearing rings, each rolling-element bearing ring including:
   an axially extending outer surface;
   two radially extending side surfaces; and
   an inner surface configured to at least partially contact a rolling element,
   wherein at least one recess is formed in the inner surface and configured to work together with a lifting tool,
   wherein a first one of the two bearing rings is axially longer than a second one of the two bearing rings.

13. A method of lifting a bearing ring for a rolling-element bearing having:
   an axially extending outer surface,
   two radially extending side surfaces,
   an inner surface comprising a rolling-element contact surface configured to at least partially contact a rolling element, the inner surface including at least one recess, and
   at least two recesses, each recess formed extending inward from in the inner surface at a location proximate and inward from the respective radially extending side surface of the two radially extending side surfaces and configured to work together with a lifting tool, each recess of the at least two recesses comprising a pair of generally radially extending, generally parallel, and opposing facing surfaces,
   wherein at least one of the at least two recesses is formed between a first radially extending side surface of the two radially extending side surfaces and the rolling-element contact surface,
   wherein at least a second of the at least two recesses is formed between a second radially extending side surface of the two radially extending side surfaces and the rolling-element contact surface;
   the method comprising steps of:
   placing a portion of a lifting tool in one or more of the at least two recesses; and
   lifting the bearing ring using the lifting tool.

14. The method according to claim 13, wherein one or more of the at least two recesses comprises a circumferential groove having a radial depth.

15. The method according to claim 13, wherein at least one of the at least two recesses comprises at least two discrete notches.

16. The method according to claim 13, wherein the inner surface includes a rolling-element contact surface and a first edge surface axially adjacent to the rolling-element contact surface, wherein the at least one recess is located in the first edge surface.

17. The method according to claim 16, wherein the inner surface comprises an inner surface of a flange.

* * * * *